United States Patent
Park et al.

(10) Patent No.: US 9,593,956 B2
(45) Date of Patent: Mar. 14, 2017

(54) METHOD AND SYSTEM FOR AUTOMATICALLY DETECTING CONTROL SECTION

(71) Applicant: Thinkware Corporation, Seongnam-si, Gyeonggi-do (KR)

(72) Inventors: Gyu Hyeon Park, Seongnam-si (KR); Kyu Nam Lee, Seongnam-si (KR); Yong Jin Cho, Seongnam-si (KR)

(73) Assignee: Thinkware Corporation, Seongnam-si (KR)

(*) Notice: Subject to any disclaimer, the term of this patent is extended or adjusted under 35 U.S.C. 154(b) by 0 days.

(21) Appl. No.: 14/679,772

(22) Filed: Apr. 6, 2015

(65) Prior Publication Data

US 2015/0292896 A1 Oct. 15, 2015

(30) Foreign Application Priority Data

Apr. 14, 2014 (KR) .................. 10-2014-0044045
Jul. 17, 2014 (KR) .................. 10-2014-0090287

(51) Int. Cl.
*G01C 21/34* (2006.01)

(52) U.S. Cl.
CPC ............................... *G01C 21/3415* (2013.01)

(58) Field of Classification Search
CPC ..... G01C 21/3415; G01C 21/06; G01C 21/34
See application file for complete search history.

(56) References Cited

U.S. PATENT DOCUMENTS

2004/0143387 A1* 7/2004 Shimizu ............. G01C 21/3415
701/414
2004/0143388 A1* 7/2004 Yano ...................... G01C 21/34
701/533

FOREIGN PATENT DOCUMENTS

KR 10-2004-0016251 A 2/2004

* cited by examiner

*Primary Examiner* — Yonel Beaulieu
*Assistant Examiner* — Martin Weeks
(74) *Attorney, Agent, or Firm* — Fenwick & West LLP

(57) ABSTRACT

A method and system for automatically detecting a control section using traffic information is disclosed. The automatic control section detection system may include an analyzer configured to analyze a primary control section that is a control section included in traffic control information; and a detector configured to detect an additional control section associated with the primary control section based on connectivity and directivity of roads connected to the primary control section.

17 Claims, 15 Drawing Sheets

- - - - - - - - - Search route

METHOD AND SYSTEM FOR AUTOMATICALLY DETECTING CONTROL SECTION

CROSS-REFERENCE TO RELATED APPLICATION

This application claims the priority benefit of Korean Patent Application No. 10-2014-0044045, filed on Apr. 14, 2014, and Korean Patent Application No. 10-2014-0090287, filed on Jul. 17, 2014, in the Korean Intellectual Property Office, the disclosures of which are each incorporated herein by reference in its entirety.

BACKGROUND

1. Field of Technology

Embodiments of the present disclosure relate to technology for generating a detour route by avoiding a control section on roads.

2. Description of the Related Art

A navigation system verifies a road network between a departure and a destination, and provides an optimal route to a variety of moving objects including a vehicle.

A general navigation system receives a navigation message from a global positioning system (GPS) using a GPS receiver, detects a driving state of a moving object by installing sensors such as a gyroscope and an accelerometer in the moving object, determines a current location of the moving object being driven through dead-reckoning using the navigation message received at the GPS receiver and driving state detection signals sensed at the sensors, matches the determined current location of the moving object to map data, and displays the current location of the moving object on a display screen together with a map.

Accordingly, a user of the moving object may verify the current location of the moving object using the navigation system, and may verify an optimal route from the current location to a destination. Further, the user of the moving object may efficiently utilize a given road network by planning a driving route of the moving object along a guide of the navigation system, and by driving the moving object according to the planned route. For example, Korean Laid-Open Publication No. 10-2004-0016251, published on Feb. 21, 2004, titled "system and method for providing optimal route of vehicle" discloses technology for generating an optimal route based on an actual time and distance of a vehicle being driven.

However, the navigation system according to the related art does not consider road traffic information such as various types of accidents occurring on roads, appearance of obstacles, or a road control by road repair or events. Thus, it may be difficult to satisfy a user demand to arrive at a destination within a shortest time through a bypass rather than to drive a vehicle based on a shortest distance.

SUMMARY

An aspect of the present disclosure provides a method and system for automatically detecting a control section that may generate an accurate detour route by complementing limitations found in traffic control information.

Another aspect of the present disclosure also provides a method and system for automatically detecting a control section that may automate a predetermined process of detecting a control section and applying the detected control section to a route search.

Embodiments provide a system for automatically detecting a control section, the system including an analyzer configured to analyze a primary control section that is a control section included in traffic control information; and a detector configured to detect an additional control section associated with the primary control section based on connectivity and directivity of roads connected to the primary control section.

According to an aspect, the analyzer may be configured to determine adding of a control section by analyzing a node and a link connected to the primary control section.

According to another aspect, the analyzer may be configured to determine adding of a control section based on whether the primary control section includes at least one intersection.

According to still another aspect, the detector may be configured to detect an entry/exit control section including at least one of a connection link for entry into the primary control section and a connection link for exit from the primary control section, and to set the entry/exit control section as the additional control section.

According to still another aspect, the detector may be configured to detect a U-turn control section including a link in which a U-turn is allowed as the primary control section, and to set the U-turn control section as the additional control section.

According to still another aspect, the detector may be configured to detect a pass control section including a connection link that passes the primary control section, and to set the pass control section as the additional control section.

According to still another aspect, the detector may be configured to detect the additional control section based on a control direction in which controlling of the primary control section is in progress.

According to still another aspect, the detector may be configured to detect a section corresponding to a go-straight pass code and a turn pass code of the connection link when the connection link passes between two links within the primary control section.

According to still another aspect, the detector may be configured to detect a section corresponding to a turn pass code of the connection link when the connection link does not pass between two links within the primary control section.

Embodiments also provide a system for automatically detecting a control section, the system including a detector configured to detect an additional control section associated with a control section included in traffic control information, based on connectivity and directivity of roads connected to the control section; and a provider configured to provide a route search function using the control section and the additional control section.

According to an aspect, the detector may be configured to detect at least one link among a connection link for entry into the control section, a connection link for exit from the control section, a U-turn link in which a U-turn is allowed as the control section, and a connection link that passes the control section, and to set the detected link as the additional control section.

According to another aspect, the provider may be configured to generate a detour route that avoids a section included in an avoidance section list by setting the control section and the additional control section as the avoidance section list in response to a route search request.

Embodiments also provide a method for automatically detecting a control section, configured as a computer, the method including analyzing a primary control section that is a control section included in traffic control information; and detecting an additional control section associated with the primary control section, based on connectivity and directivity of roads connected to the primary control section.

Effect

According to the embodiments herein, it is possible to complement limitations found in traffic control information, and to generate an accurate detour route by automatically detecting an additional control section occurring due to a section in which an actual traffic control is in progress.

Also, according to the embodiments herein, it is possible to accurately and efficiently manage a traffic control section, and to improve the quality of a detour route by automating a predetermined process of detecting a control section and applying the detected control section to a route search.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
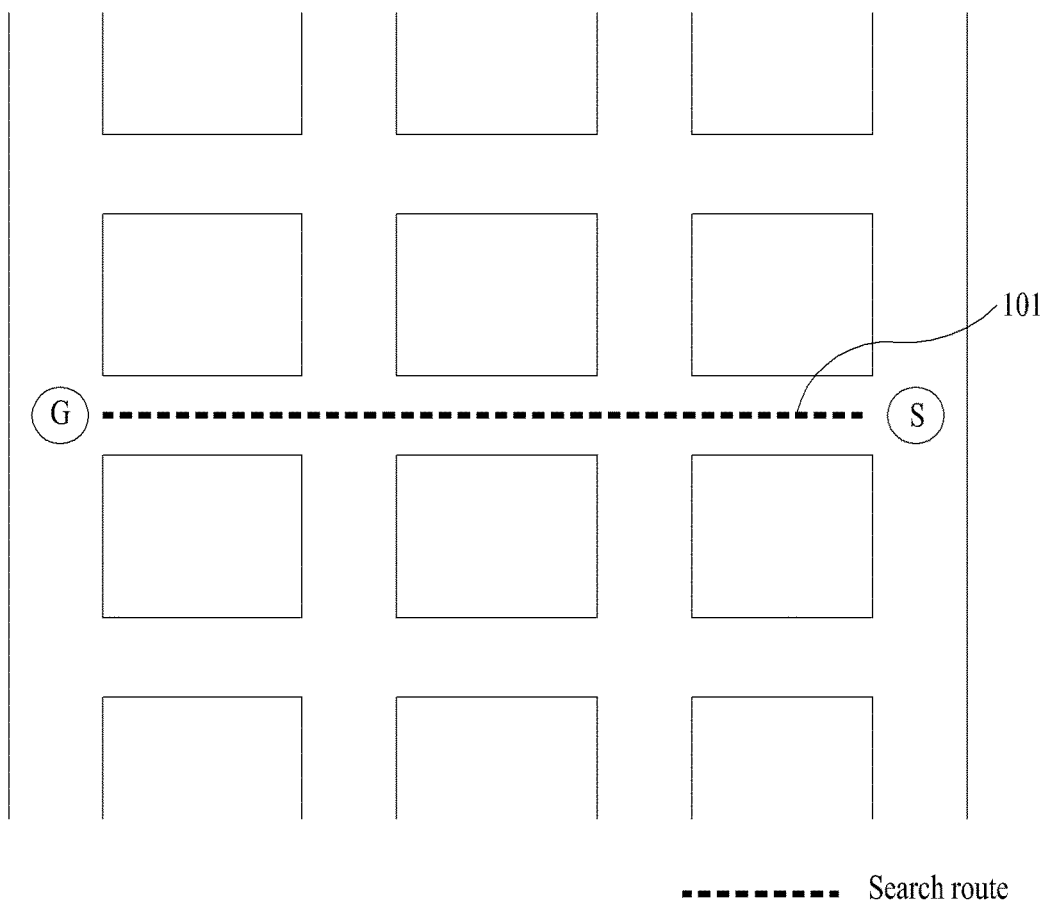
FIG. 1 through FIG. 3 illustrate examples of a driving route using a search method according to the related art.

Reference will now be made in detail to exemplary embodiments, examples of which are illustrated in the accompanying drawings, wherein like reference numerals refer to like elements throughout. Exemplary embodiments are described below to explain the present disclosure by referring to the figures.

The embodiments herein relate to technology for generating a detour route based on traffic control information, and more particularly, to an automatic control section detection method and system that may automatically detect a control section based on traffic control information.

The term "traffic control" used here indicates a situation in which traffic of a predetermined district is temporarily limited or controlled due to an event, for example, a marathon game, a street demonstration, a street cheering, and a parade, a variety of accidents on roads, the appearance of obstacles, a road repair, and a sudden increase in traffic. Traffic control information may include the overall information about an actual traffic control section, a traffic control direction, a traffic control time, and a traffic control cause.

A general navigation system may verify a departure and a destination set by a user, may generate a route from the departure to the destination, and may provide the user with a route corresponding to a shortest distance among generated routes. For example, referring to FIG. 1, the general navigation system may generate a shortest route 101 from a departure S to a destination G based on the departure S and the destination G.

Figure 2:
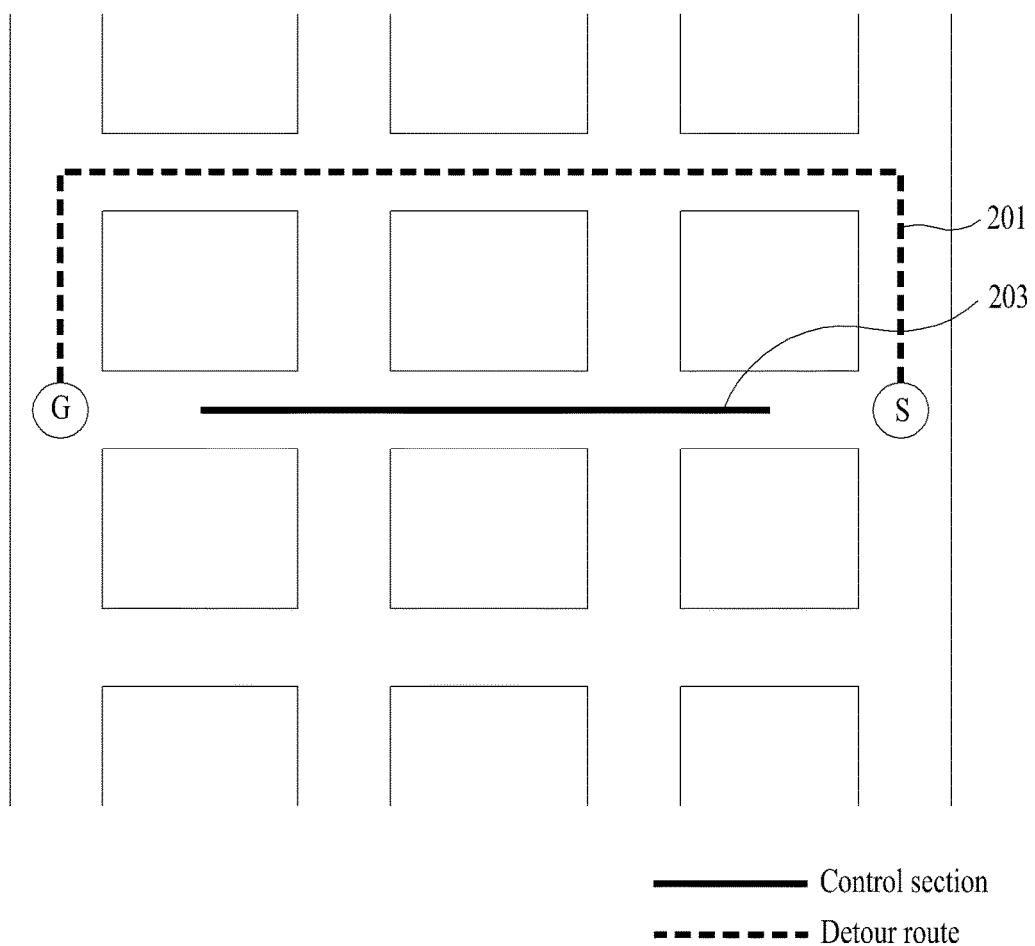

Here, when traffic control information is generated, the navigation system may generate a detour route by avoiding a control section. For example, referring to FIG. 2, when a control section 203 is present between the departure S and the destination G, the navigation system may generate a detour route 201 by avoiding the control section 203.

In general, traffic control information may include only information about an actual control section indicating a section in which an actual traffic control is in progress.

When a driving route between a departure and a destination includes a control section or is in parallel with a direction in which traffic is being controlled, a detour route may be readily generated based on only information about the actual control information.

Figure 3:
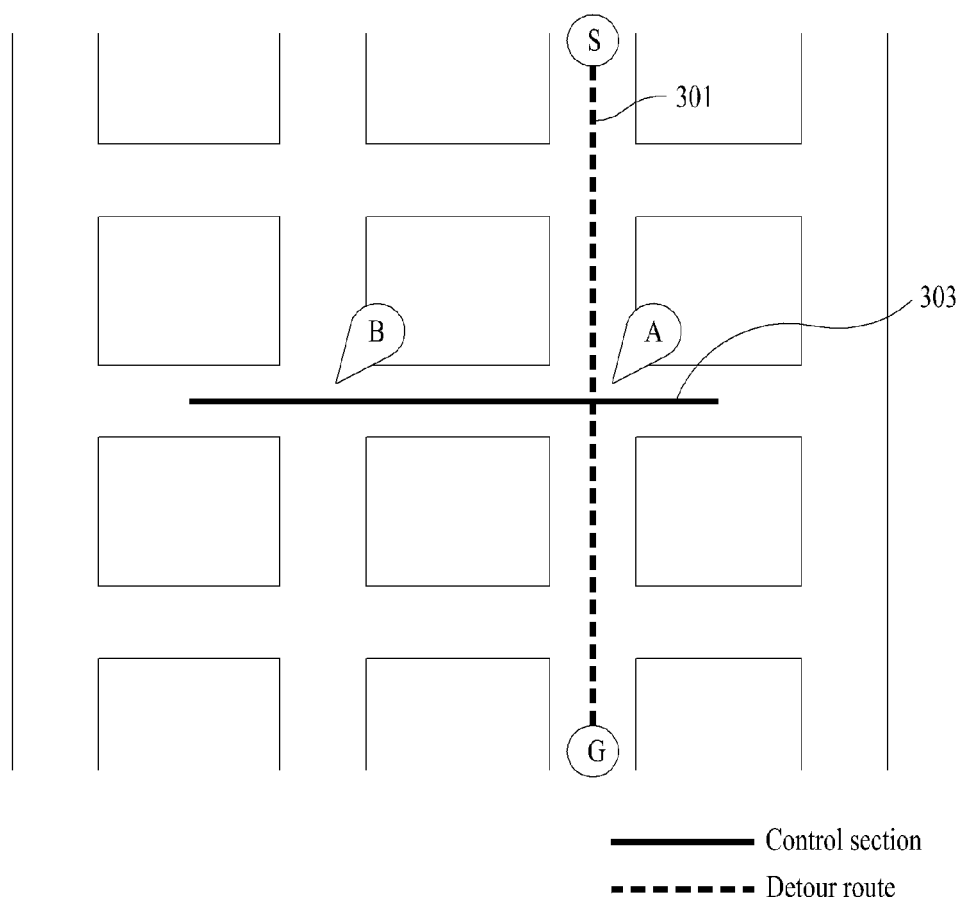

However, referring to FIG. 3, with respect to a route that crosses a control section 303 not in parallel with a traffic control direction of the control section 303, some issues may not be outperformed only with current traffic control information. That is, since a driving route 301 between a departure S and a destination G does not directly include the control section 303, a route may be generated using a general search method that connects the departure S and the destination G without considering the control section 303. However, in this example, the driving route 301 includes a section in which entry is limited due to a traffic control. When a user moves along the driving route 301, the user may recognize that the user is disallowed to enter due to a traffic control at a point A corresponding to an interaction and may change a route by turning at the point A. Here, a new route that traverses a point B may be generated through a re-search. However, the user cannot enter along with this new route due to the traffic control. In this example, when the user arrives around the control section 303, that is, point A or B, the user may become aware that the user cannot pass the roads and then make a detour.

As described above, since a route that crosses a control section between a departure and a destination is continuously generated, a user complaint may increase. Current traffic control information includes only information about a section in which an actual control is in progress and a detour route is generated based on such information. Thus, it may be difficult to generate a route capable of actually avoiding a control section.

Accordingly, in addition to a section (hereinafter, a primary control section) in which an actual control is in progress, included in traffic control information, there is a need to additionally set a section, for example, a crossing intersection, (hereinafter, a secondary control section) of which a control is unavoidable due to the primary control section.

A method of adding a secondary control section includes a method of verifying a primary control section using manpower and inputting secondary control sections associated with the primary control section one by one. However, a method using manpower is significantly inefficient. In the case of a marathon course or a parade, a corresponding section is very long and may be frequently performed based on regions. Accordingly, to process such an operation manually may be inefficient.

Therefore, the present disclosure is to automate a predetermined process applicable to a route search by automatically detecting a secondary control section associated with a primary control section based on traffic control information and by generating a list of detected secondary control sections.

Figure 4:
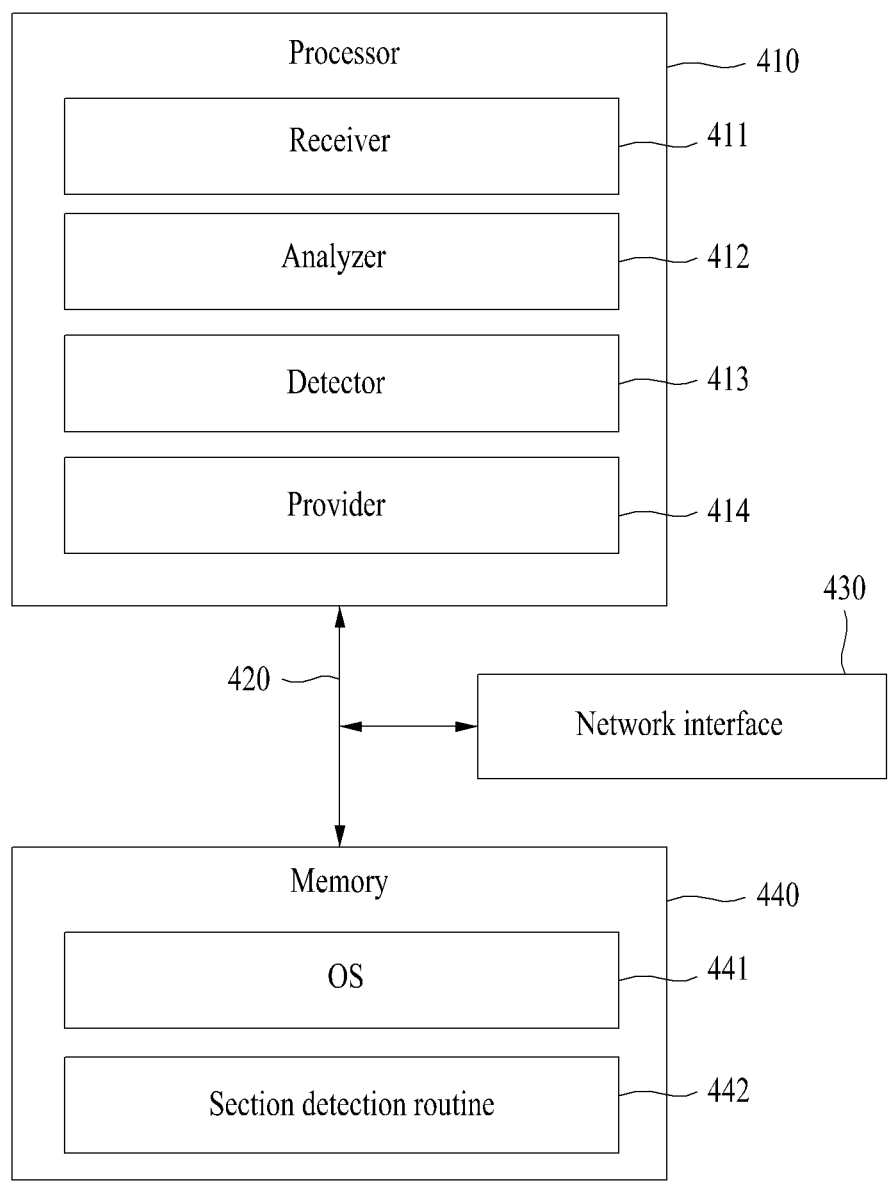
FIG. 4 is a block diagram illustrating a system for automatically detecting a control section according to an embodiment.
Figure 5:
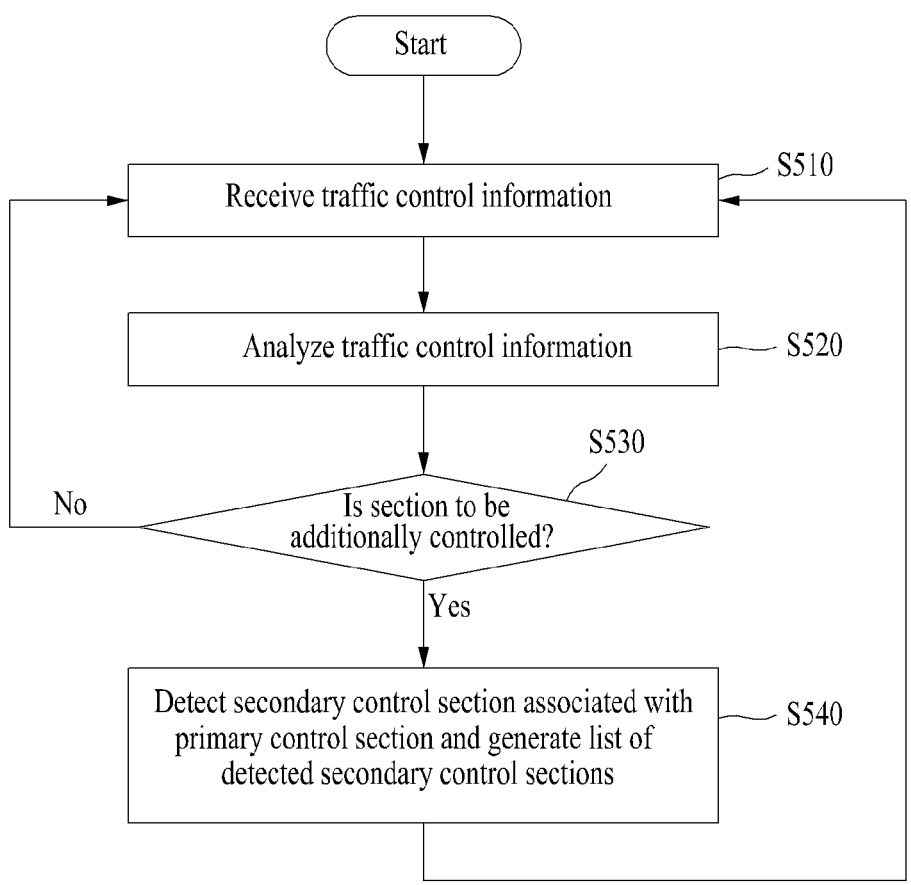
FIG. 5 is a flowchart illustrating a method of automatically detecting a control section according to an embodiment.

FIG. 4 is a block diagram illustrating a system for automatically detecting a control section according to an embodiment, and FIG. 5 is a flowchart illustrating a method of automatically detecting a control section according to an embodiment.

Referring to FIG. 4, the automatic control section detection system 400 according to an embodiment may include a processor 410, a bus 420, a network interface 430, and a memory 440. The memory 440 may include an operating system (OS) 441 and a section detection routine 442. The processor 410 may include a receiver 411, an analyzer 412, a detector 413, and a provider 414. According to other embodiments, the automatic control section detection system 400 may include a further number of constituent elements than the number of constituent elements of FIG. 4.

The memory 440, as non-transitory computer-readable recording media, may include a permanent mass storage device such as random access memory (RAM), read only memory (ROM), and a disk drive. Also, a program code for the OS 441 and the section detection routine 442 may be stored in the memory 440. The software constituent elements may be loaded from non-transitory computer-readable media separate from the memory 440 using a drive mechanism (not shown). The non-transitory computer-readable media may include computer-readable media such as a floppy disk, a tape, a DVD/CD-ROM drive, and a memory card. According to other embodiments, the software constituent elements may be loaded to the memory 440 through the network interface 430, instead of using the non-transitory computer readable media.

The bus 420 may enable communication and data transmission between the constituent elements of the automatic control section detection system 400. The bus 420 may be configured using a high-speed serial bus, a parallel bus, a storage area network (SAN), and/or other appropriate communication technologies.

The network interface 430 may be a computer hardware constituent element to connect the automatic control section detection system 400 to a computer network. The network interface 430 may connect the automatic control section detection system 400 to the computer network through a wireless or wired connection.

The processor 410 may be configured to process an instruction of a computer program by performing a basic arithmetic and logic operation, and an input/output (I/O) operation of the automatic control section detection system 400. The instruction may be provided from the memory 440 or the network interface 430 to the processor 410 through the bus 420. The processor 410 may be configured to execute a program code for the receiver 411, the analyzer 412, the detector 413, and the provider 414. The program code may be stored in a storage device such as the memory 440.

A function of automatically extracting a control section may be applied to a traffic information engine to receive traffic control information. Regardless of a terminal or a server, every time new traffic control information is received, an automatic control section extracting function may be configured to be executed. That is, the automatic control section detection system 400 may be configured in an application form on a terminal. It is only an example, the automatic control section detection system 400 may be configured to be included in a service platform that provides a service in response to a request from the terminal in a client-server environment.

Figure 13:
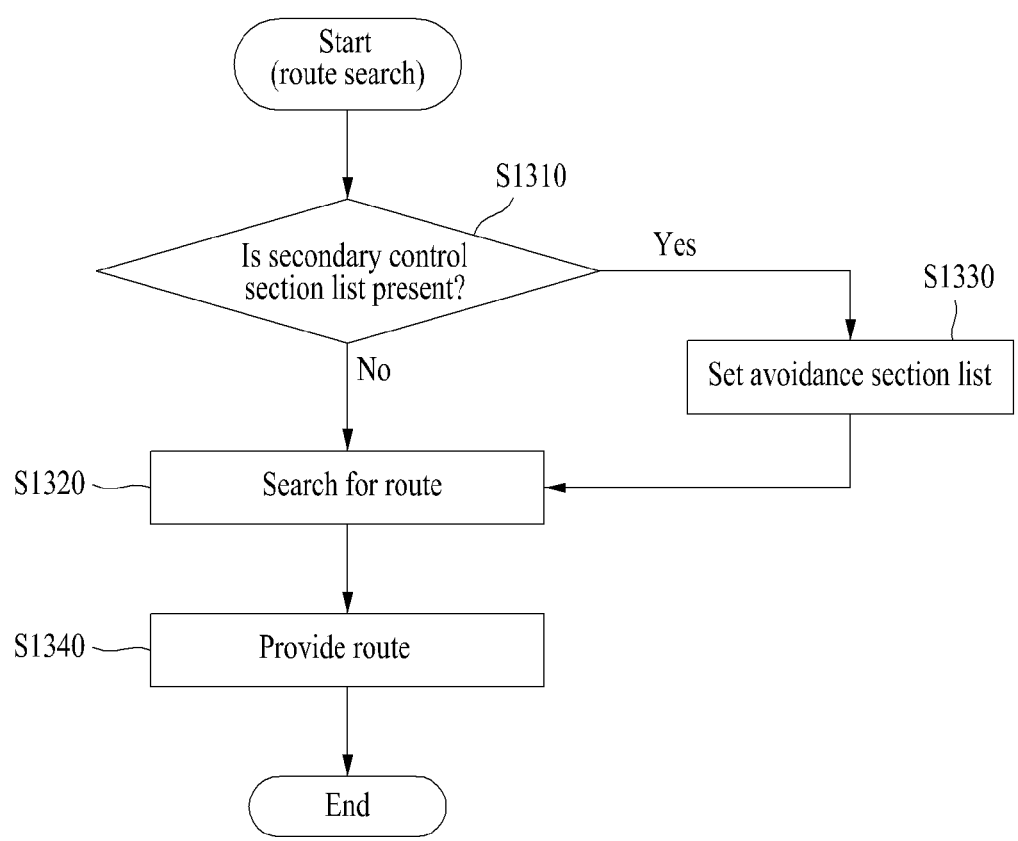
FIG. 13 is a flowchart illustrating a route providing process according to an embodiment.

The receiver 411, the analyzer 412, and the detector 413 may be configured to perform operations S510 through S540 of FIG. 5, and the provider 414 may be configured to perform operations S1310 through S1340 of FIG. 13.

In operation S510, the receiver 411 may frequently or periodically receive, from a traffic center, traffic control information registered to the traffic center. Here, traffic control information follows a national standard link system managed by the Ministry of Construction and Transportation and includes information about a primary control section in which an actual control is in progress, for example, a link list corresponding to the primary control section, a control direction, a control time, and a control cause. Herein, the primary control section may indicate a road section on which traffic is temporarily limited or controlled due to an event, for example, a marathon game, a street demonstration, a street cheering, and a parade, a variety of accidents on roads, the appearance of obstacles, a road repair, and a sudden increase in traffic.

In operations S520 and S530, the analyzer 412 may analyze traffic control information received in operation S510, and may determine whether a section is to be additionally controlled with respect to the primary control section. For example, the analyzer 412 may analyze whether an additional control section is present with respect to the primary control section based on linear data of a road network. The linear data may include a node and a link that constitutes the road network. For example, whether the additional control section is required may be determined by analyzing the node and the link connected to the primary control section and by determining whether the primary control section includes at least one interaction that allows a movement from a main road to another road.

In operation S540, when the additional control section is determined to be required with respect to the primary control section, the detector 413 may automatically detect a secondary control section associated with the primary control section and may generate a list of detected secondary control sections.

Hereinafter, a process of detecting the secondary control section will be described.

Figure 6:
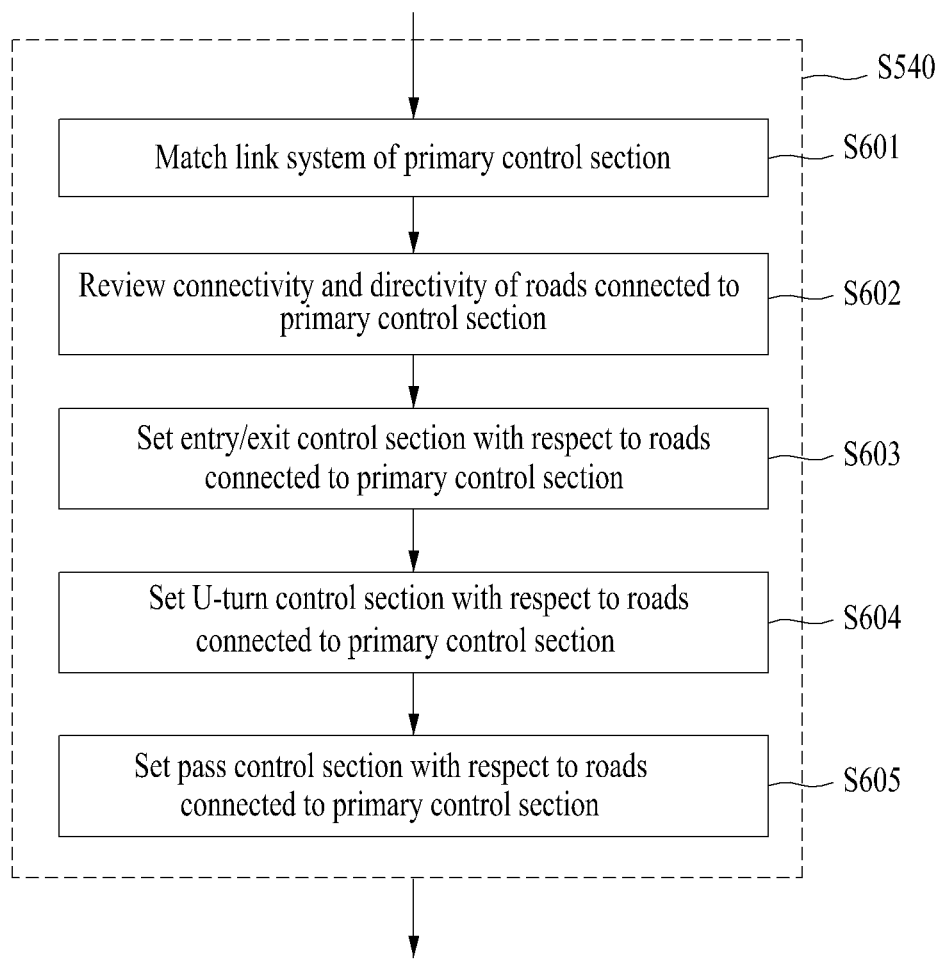
FIG. 6 is a flowchart illustrating a process of automatically detecting a control section according to an embodiment.

FIG. 6 is a flowchart illustrating a process of automatically detecting a control section according to an embodiment. Operations S601 through S605 included in the automatic control section detection process according to an embodiment may be performed by the detector 413 of FIG. 4.

In operation S601, the detector 413 may match a national standard link system of a link list of the primary control section included in traffic control information, to a serviceable link system.

In operation S602, the detector 413 may review the connectivity and the directivity of the secondary control section associated with the primary control section. That is, the detector 413 may verify the connectivity and the directivity of all the roads connected to the primary control section based on a control direction of the primary control section included in traffic control information, and a node and a link connected to the primary control section.

In operations S603 through S605, the detector 413 may detect at least one of an entry/exit control section, a U-turn control section, and a pass control section with respect to all the roads connected to the primary control section, and may set the detected section as the secondary control section.

Figure 7:
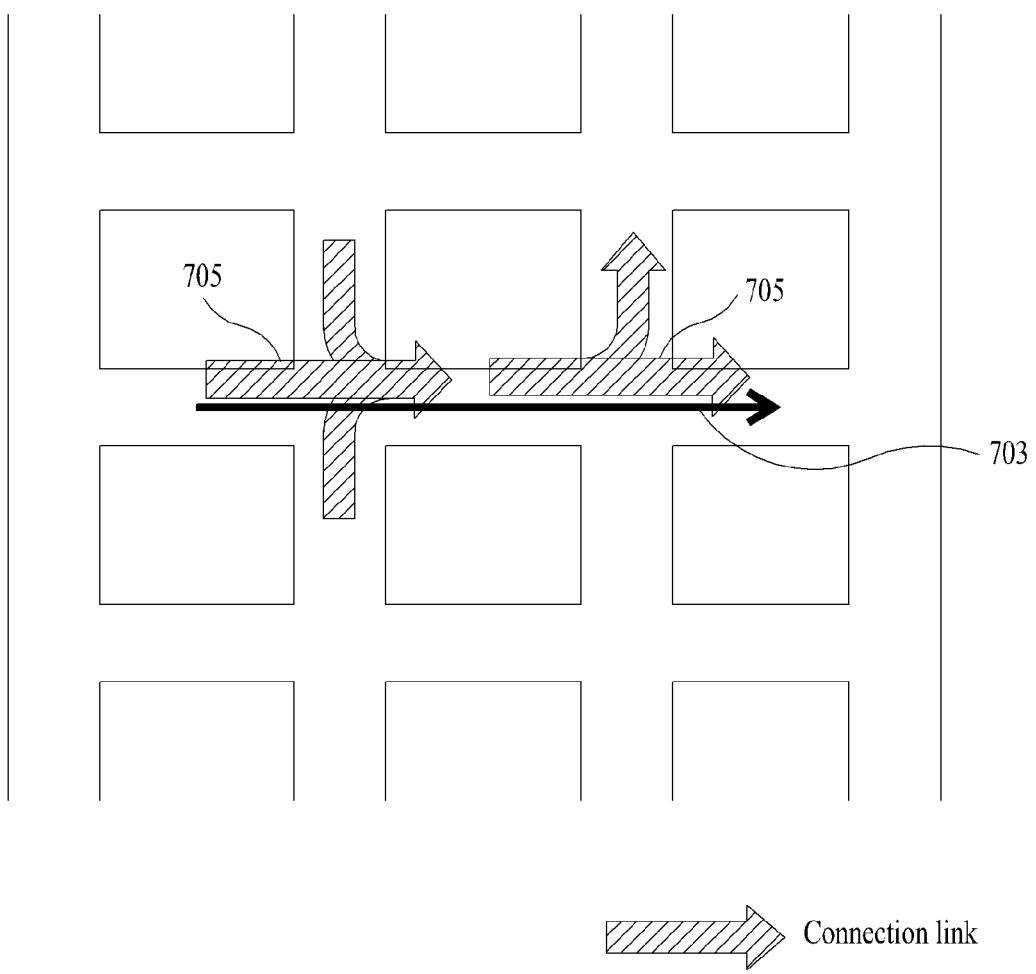
FIG. 7 through FIG. 12 illustrate examples of a process of automatically detecting a control section according to an embodiment.
Figure 8:
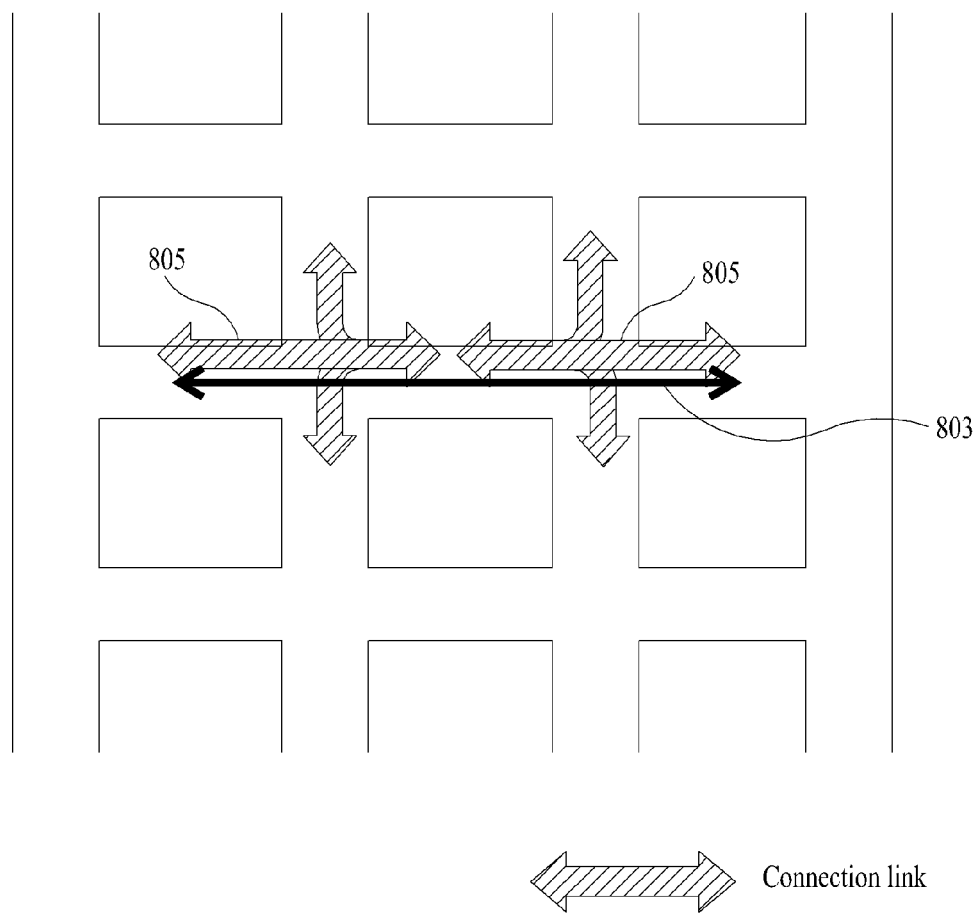

The entry/exit control section is used to detect a connection link for entry into and exit from a primary control section based on the primary control section (link) and to control the detected connection link as a secondary control section. The aforementioned aspect is most basic in the automatic control section detection process and may be applied to all of a unidirectional primary control section and a bi-directional primary control section. Referring to FIG. 7, when a control direction of a primary control section 703 is unidirectional, the detector 413 may detect a connection link 705 that enters in the control direction of the primary control section 703 or exits in the control direction of the primary control section 703. Meanwhile, referring to FIG. 8, when a control direction of a primary control section 803 is bi-directional, the detector 413 may detect a connection link 805 that enters in both directions of the primary control section 803 or exits in both directions of the primary control section 803.

As described above, according to an embodiment, the detector 413 may automatically detect a connection link 705 or 805 for entry into and exit from a primary control section based on the directivity of the primary control section, and may set the detected connection link 705 or 805 as a secondary control section.

Figure 9:
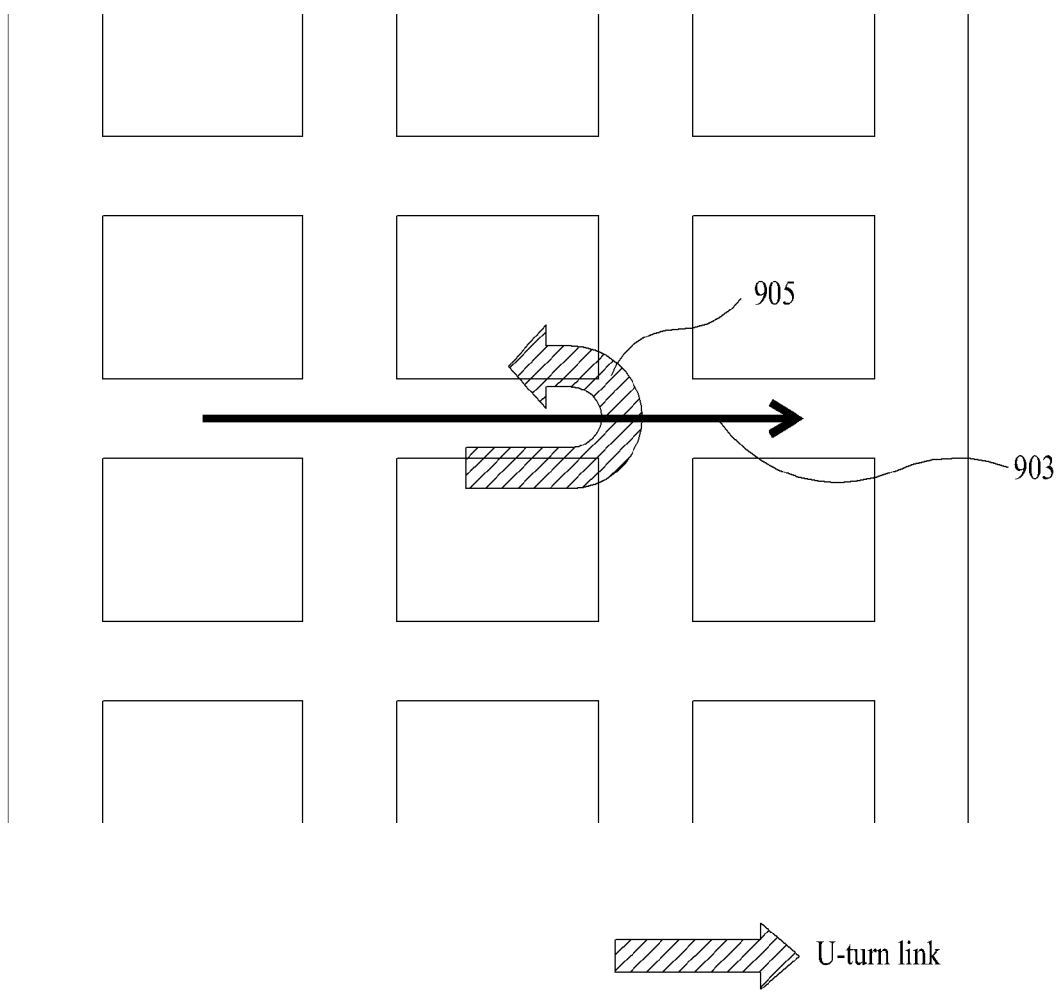
Figure 10:
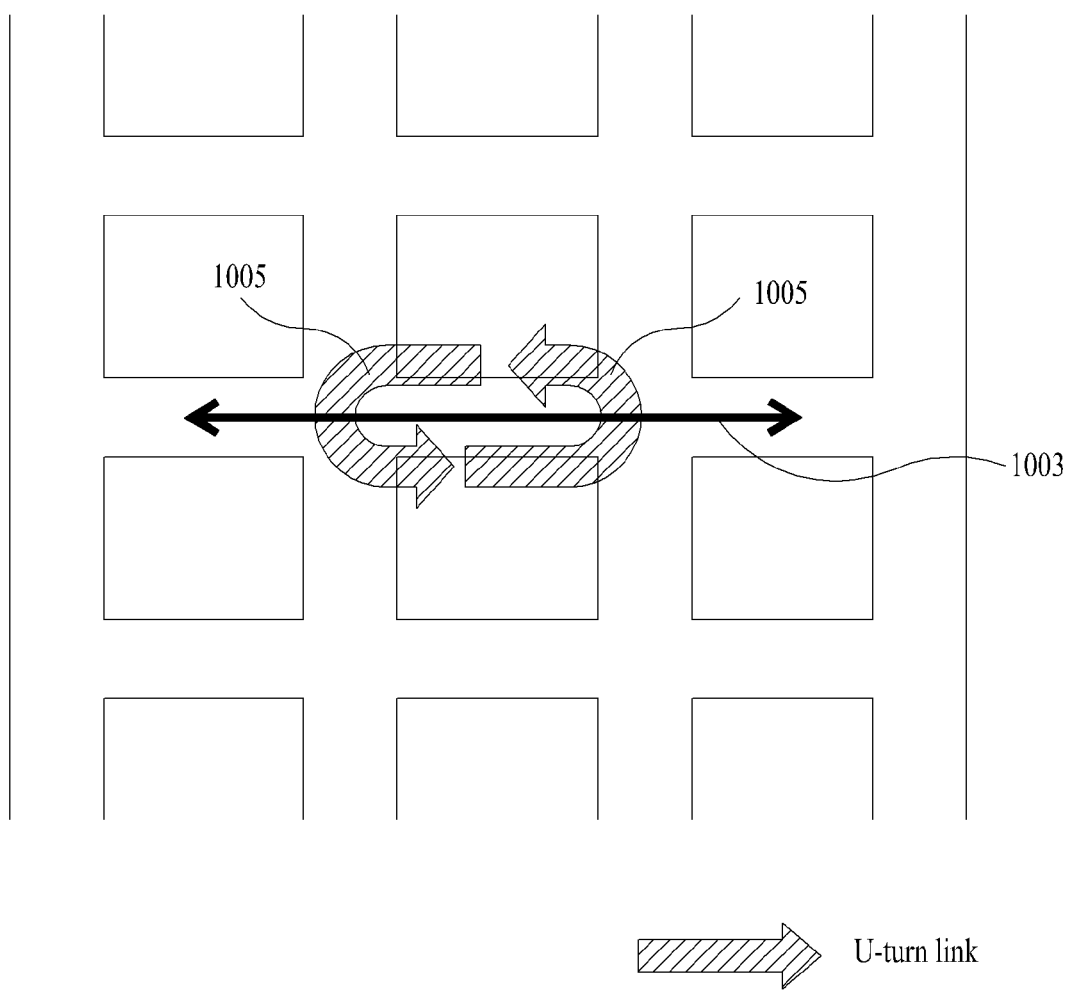

The U-turn control section is used to detect a section in which a U-turn is allowed as a primary control section and to control a U-turn of the detected link. The U-turn control section is similar to the entry/exit control section. A user needs to pass the primary control section to make a U-turn and thus, the U-turn may be controlled based on a result of verifying whether the U-turn is allowed at a corresponding link. Referring to FIG. 9, when a control direction of a primary control section 903 is unidirectional, the detector 413 may detect a U-turn link 905 in which a U-turn is allowed in the control direction of the primary control section 903. Referring to FIG. 10, when a control direction of a primary control section 1003 is bi-directional, the detector 413 may detect a U-turn link 1005 in which a U-turn is allowed in both directions of the primary control section 1003.

As described above, according to an embodiment, the detector 413 may automatically set a connection link 905 or 1005 in which a U-turn is allowed in a primary control section based on the directivity of the primary control section, and may set the detected connection link 905 or 1005 as a secondary control section.

Figure 11:
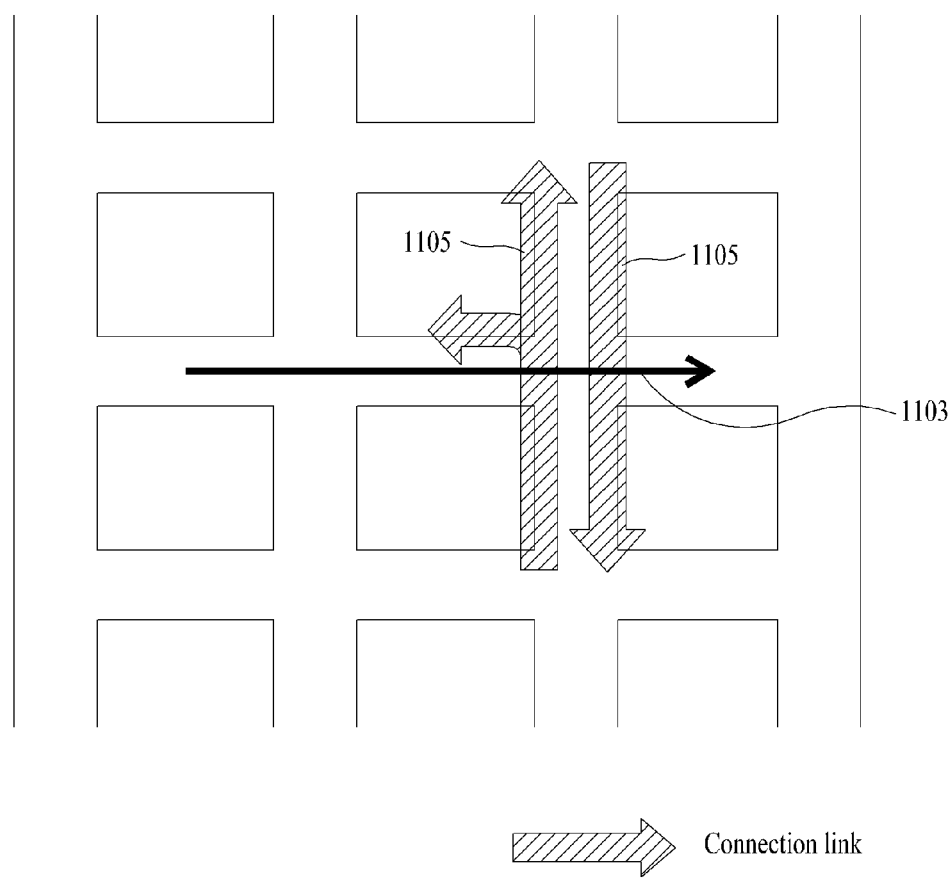
Figure 12:
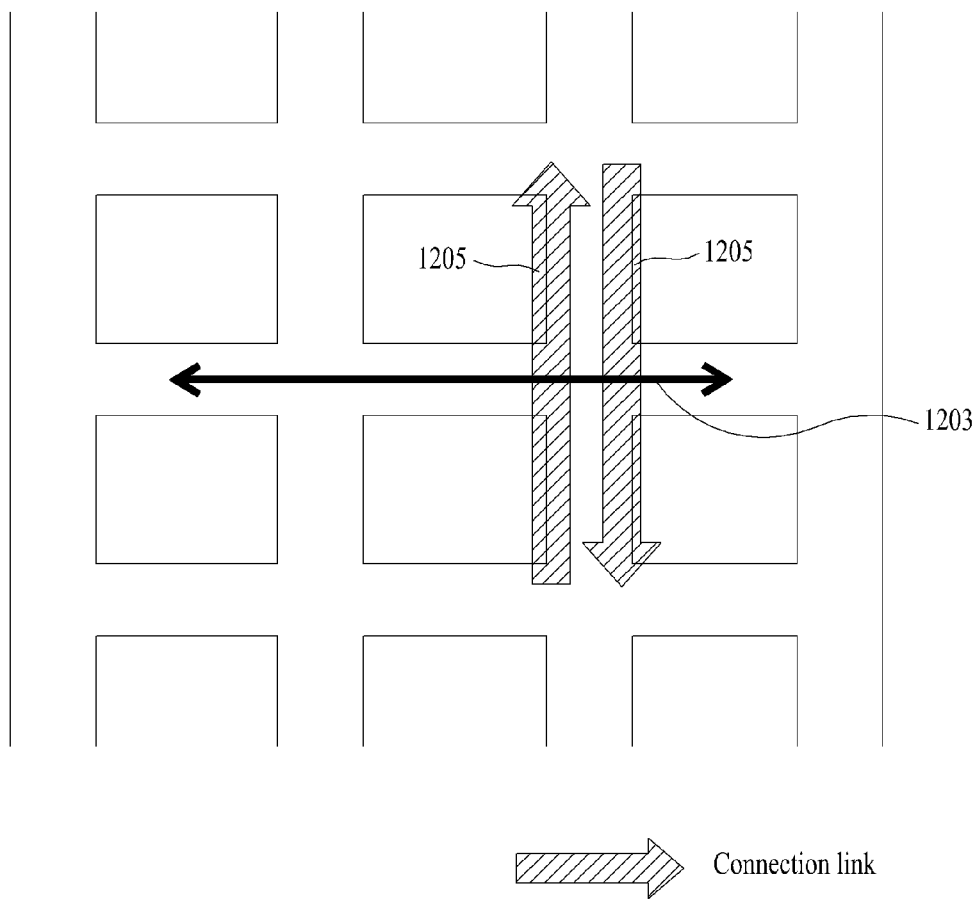

The pass control section is used to control all of connection links that pass a primary control section, and may be set by inspecting a connection link that passes between two control section links within the primary control section. To this end, the detector 413 needs to inspect locations of links between the connected two control section links because a situation in which a connection link is disconnected between control section links differs from a situation in which the connection link is connected between the control section links. When the connection link is disconnected between the control section links, there is no pass by going straight and thus, an additional control is performed by excluding a go-straight pass code and by verifying only a turn pass code, for example, turn left or turn right. When the connection link is connected between the control section links, an additional control is performed by verifying all of the go-straight pass code and the turn pass code. In this instance, when the control direction of the primary control section is bidirectional, there is no need to verify the turn pass code because it is set as the entry/exit control section. Referring to FIG. 11, when a control direction of a primary control section 1103 is unidirectional, the detector 413 may detect a connection link 1105 that passes between control section links included in the primary control section 1103 by verifying a go-straight pass code and a turn pass code of roads connected to the primary control section 1103. Referring to FIG. 12, when a control direction of a primary control section 1203 is bidirectional, the detector 413 may detect a connection link 1205 that passes between control section links included in the primary control section 1203 by verifying a go-straight pass code of roads connected to the primary control section 1203.

As described above, according to an embodiment, the detector 413 may automatically detect a connection link 1105 or 1205 that passes a primary control section based on the directivity of the primary control section, and may set the detected connection link 1105 or 1205 as a secondary control section. That is, when a control direction of the primary control section is unidirectional, the detector 413 may set the secondary control section by verifying a go-straight pass code and a turn pass code. When the control direction of the primary control section is bidirectional, the detector 413 may set the secondary control section by verifying only the go-straight pass code.

Accordingly, the detector 413 may additionally generate a list of secondary control sections associated with the primary control section by detecting at least one of the entry/exit control section, the U-turn control section, and the pass control section with respect to all of the roads connected to the primary control section and by setting the detected section as the secondary control section.

FIG. 13 is a flowchart illustrating a route providing process according to an embodiment. Operations S1310 through S1340 of the route providing process according to an embodiment may be performed by the provider 414 of FIG. 4.

In operation S1310, the provider 414 may determine whether a secondary control section list is present based on traffic control information, in response to a route search request using a departure and a destination. In operation S1320, when the secondary control section list is absent, the provider 414 may search for a route that avoids a primary control section included in the traffic control information.

Conversely, when the secondary control section list is present in operation S1310, the provider 414 may set, as an avoidance section list, the primary control section included in the traffic control information and a secondary control section automatically detected with respect to the primary control section in operation S1330, and may search for a route that avoids all of the primary control section and the secondary control section in operation S1320.

Figure 14:
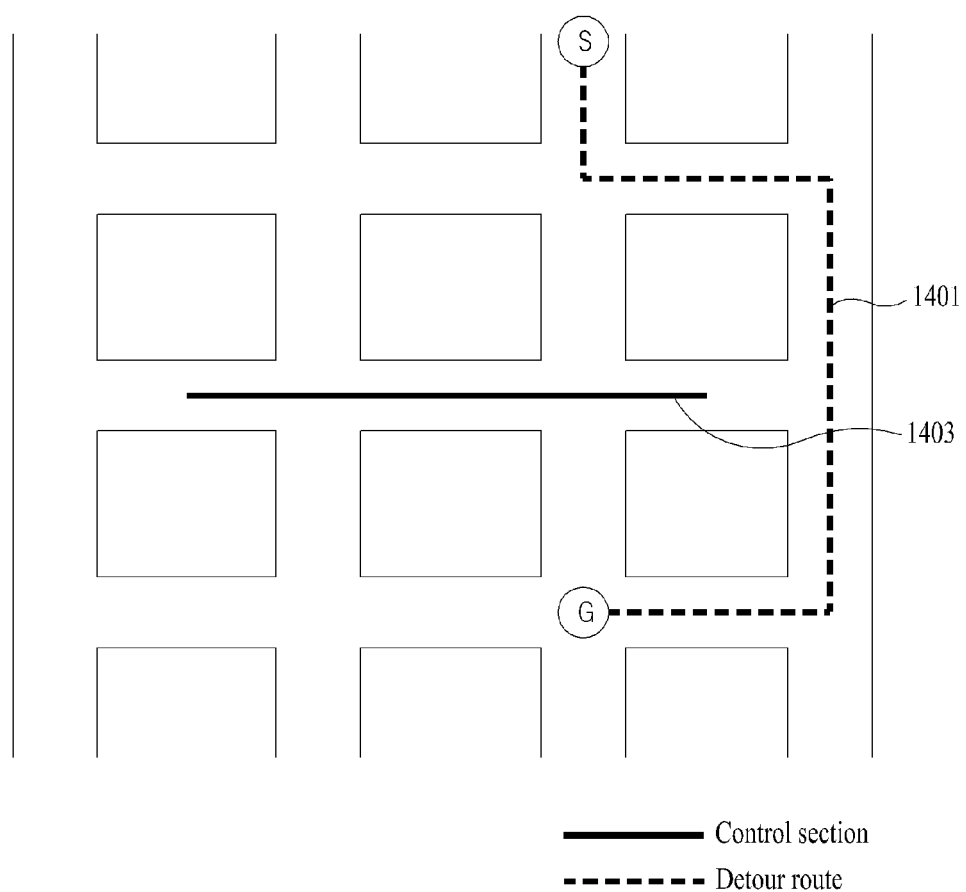
FIG. 14 and FIG. 15 illustrate examples of a detour route according to an embodiment.

In operation S1340, the provider 414 may provide the found route as a driving route between the departure and the destination. For example, referring to FIG. 14, when a traffic control is in progress in a section between a departure S and a destination G, the provider 414 may generate a detour route 1401 that avoids a primary control section 1403 acquirable from traffic control information and a secondary control section, for example, an entry/exit control section, a U-turn control section, and a pass control section, to be additionally controlled due to the primary control section 1403.

Figure 15:
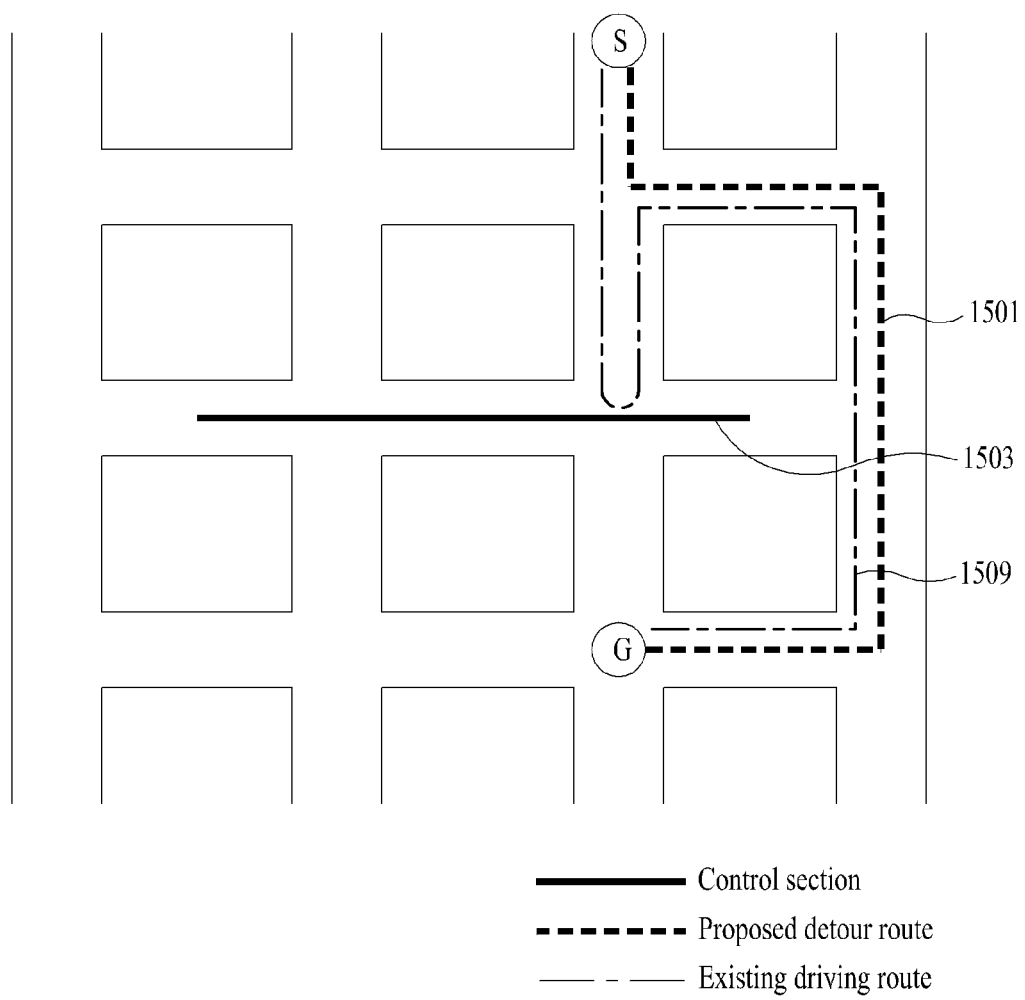

FIG. 15 illustrates an example of comparing a detour route 1501 using a search method according to an embodiment of the present disclosure and a driving route 1509 using a search method according to the related art. Referring to FIG. 15, in the related art, since the driving route 1509 is generated based on only a primary control section 1503, actually inaccessible sections that are adjacent to the primary control section 1503 may be found and included in the driving route 1509. In the embodiments herein, the detour route 1501 that avoids all of the inaccessible sections adjacent to the primary control section 1503 may be generated based on the primary control section 1503 and an additional control section by the primary control section 1503.

According to embodiments, it is possible to complement limitations found in traffic control information, and to generate an accurate detour route by automatically detecting an additional control section occurring due to a section in which an actual traffic control is in progress. Also, according to embodiments, it is possible to accurately and efficiently manage a traffic control section and to improve the quality of a detour route by automating a predetermined process of detecting a control section and applying the detected control section to a route search.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present disclosure have been shown and described, the present disclosure is not limited to the described embodiments herein. Instead, it would be appreciated by those skilled in the art that changes may be made to these embodiments without departing from the principles and spirit of the invention, the scope of which is defined by the claims and their equivalents.

What is claimed is:

1. A system for providing route directions, the system comprising:
   a memory storing comprising computer readable instructions; and
   at least one processor configured to execute the computer readable instructions, the instructions when executed by the processor cause the processor to perform steps comprising:
      receiving a query for route directions from a starting location to a destination location;
      analyzing a primary control section that is representative of a first road located between the starting location and the destination location, the first road including traffic according to traffic control information associated with the first road;
      detecting an additional control section associated with the primary control section based on connectivity and directivity of roads connected to the primary control section, the additional control section representative of a second road that is connected to the first road that includes traffic;
      detecting a pass control section associated with the second road responsive to determining that the second road intersects the first road, wherein the second road is determined to allow a turn onto the first road and to allow crossing of the first road responsive to the second road passing through the first road, and wherein the second road is determined to allow a turn onto the first road and disallow crossing of the first road responsive to the second road not passing through the first road; and
      providing the route directions from the starting location to the destination location that avoids the primary control section associated with the first road including traffic and the detected pass control section associated with the second road.

2. The system of claim 1, wherein the instructions when executed by the processor cause the processor to perform steps comprising determining adding of a control section by analyzing a node and a link connected to the primary control section.

3. The system of claim 1, wherein the instructions when executed by the processor cause the processor to perform steps comprising determining adding of a control section based on whether the primary control section comprises at least one intersection.

4. The system of claim 1, wherein the instructions when executed by the processor cause the processor to perform steps comprising detecting an entry/exit control section comprising at least one of a connection link for entry into the primary control section and a connection link for exit from the primary control section, and to set the entry/exit control section as the additional control section.

5. The system of claim 1, wherein the instructions when executed by the processor cause the processor to perform steps comprising detecting a U-turn control section comprising a link in which a U-turn is allowed as the primary control section, and to set the U-turn control section as the additional control section.

6. The system of claim 4, wherein the instructions when executed by the processor cause the processor to perform steps comprising detecting the additional control section based on a control direction in which controlling of the primary control section is in progress.

7. A system for providing route directions, the system comprising:
a memory storing comprising computer readable instructions; and
at least one processor configured to execute the computer readable instructions, the instructions when executed by the processor cause the processor to perform steps comprising:
receiving a query for route directions from a starting location to a destination location;
detecting an additional control section associated with a control section that is representative of a first road located between the starting location and the destination location, the first road including traffic according to traffic control information associated with the first road, the additional control section detected based on connectivity and directivity of roads connected to the control section;
detecting a pass control section associated with a second road that corresponds to the additional control section responsive to determining that the second road intersects the first road, wherein the second road is determined to allow a turn onto the first road and to allow crossing of the first road responsive to the second road passing through the first road, and wherein the second road is determined to allow a turn onto the first road and disallow crossing of the first road responsive to the second road not passing through the first road; and
provide a route search function from the starting location to the destination location using the control section and the additional control section.

8. The system of claim 7, wherein the instructions when executed by the processor cause the processor to perform steps comprising detect at least one link among a connection link for entry into the control section, a connection link for exit from the control section, a U-turn link in which a U-turn is allowed as the control section, and a connection link that passes the control section, and to set the detected link as the additional control section.

9. The system of claim 7, wherein the instructions when executed by the processor cause the processor to perform steps comprising generate a detour route that avoids a section comprised in an avoidance section list by setting the control section and the additional control section as the avoidance section list in response to a route search request.

10. A method for providing route directions, configured as a computer, the method comprising:
receiving a query for route directions from a starting location to a destination location;
analyzing a primary control section that is representative of a first road located between the starting location and the destination location, the first road including traffic according to traffic control information associated with the first road; and
detecting an additional control section associated with the primary control section based on connectivity and directivity of roads connected to the primary control section, the additional control section representative of a second road that is connected to the first road that includes traffic;
detecting a pass control section associated with the second road responsive to determining that the second road intersects the first road, wherein the second road is determined to allow a turn onto the first road and to allow crossing of the first road responsive to the second road passing through the first road, and wherein the second road is determined to allow a turn onto the first road and disallow crossing of the first road responsive to the second road not passing through the first road; and
providing the route directions from the starting location to the destination location that avoids the primary control section associated with the first road including traffic and the detected pass control section associated with the second road.

11. The method of claim 10, wherein the analyzing comprises determining adding of a control section based on whether the primary control section comprises at least one intersection.

12. The method of claim 10, wherein the detecting comprises detecting at least one link among a connection link for entry into the primary control section, a connection link for exit from the primary control section, a U-turn link in which a U-turn is allowed as the primary control section, and a connection link that passes the primary control section, and setting the detected link as the additional control link.

13. The method of claim 12, wherein the detecting comprises detecting the additional control section based on a control direction in which controlling of the primary control direction is in progress.

14. The method of claim 10, further comprising:
providing a route search function using the primary control section and the additional control section.

15. The method of claim 14, wherein the providing comprises generating a detour route that avoids a section comprised in an avoidance section list by setting the primary control section and the additional control section as the avoidance section list in response to a route search request.

16. Non-transitory computer-readable media comprising an instruction to control a computer system to providing route directions, wherein the instruction controls the computer system by a method comprising:
receiving a query for route directions from a starting location to a destination location;
analyzing a primary control section that is representative of a first road that includes traffic according to traffic control information associated with the first road; and
detecting an additional control section associated with the primary control section based on connectivity and directivity of roads connected to the primary control section, the additional control section representative of a second road that is connected to the first road that includes traffic;
detecting a pass control section associated with the second road responsive to determining that the second road intersects the first road, wherein the second road is determined to allow a turn onto the first road and to allow crossing of the first road responsive to the second road passing through the first road, and wherein the second road is determined to allow a turn onto the first road and disallow crossing of the first road responsive to the second road not passing through the first road; and providing the route directions from the starting location to the destination location that avoids the primary control section associated with the first road including traffic and the detected pass control section associated with the second road.

17. Non-transitory computer-readable media comprising an instruction to control a computer system to provide route directions, wherein the instruction controls the computer system by a method comprising:

receiving a query for route directions from a starting location to a destination location;

detecting an additional control section associated with a control section that is representative of a first road located between the starting location and the destination location, the first road including traffic according to traffic control information associated with the first road, the additional control section detected based on connectivity and directivity of roads connected to the control section;

detecting a pass control section associated with a second road that corresponds to the additional control section responsive to determining that the second road intersects the first road, wherein the second road is determined to allow a turn onto the first road and to allow crossing of the first road responsive to the second road passing through the first road, and wherein the second road is determined to allow a turn onto the first road and disallow crossing of the first road responsive to the second road not passing through the first road; and generating a detour route that avoids a section comprised in an avoidance section list by setting the control section and the additional control section as the avoidance section list in response to a route search request;

providing the detour route.

* * * * *